Figure 1:
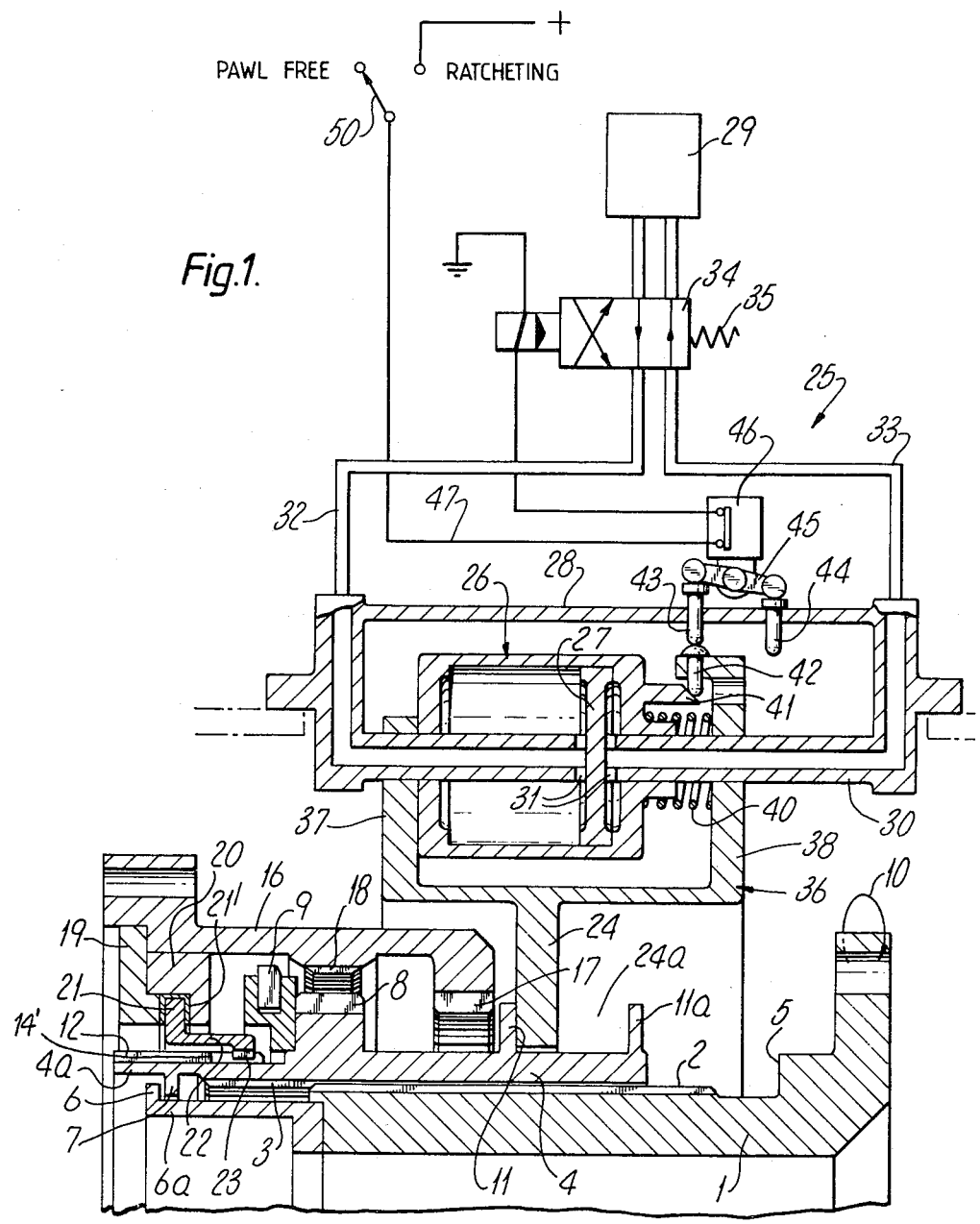

United States Patent [19]

Clements et al.

[11] 4,429,774

[45] Feb. 7, 1984

[54] PAWL AND RATCHET MECHANISM

[75] Inventors: Herbert A. Clements, Woking; Robert H. Heybourne, Thames Ditton, both of England

[73] Assignee: S. S. S. Patents Limited, Middlesex, England

[21] Appl. No.: 312,701

[22] Filed: Oct. 19, 1981

[30] Foreign Application Priority Data

Oct. 27, 1980 [GB] United Kingdom ............ 8034573

[51] Int. Cl.³ .................. F16D 23/08; F16D 23/10
[52] U.S. Cl. ........................... 192/53 H; 192/67 A
[58] Field of Search .............. 192/53 R, 53 H, 67 A

[56] References Cited

U.S. PATENT DOCUMENTS 3,460,656  8/1969  Swanson ........................ 192/53 R
3,715,019  2/1973  Heybourne et al. ........... 192/67 A

FOREIGN PATENT DOCUMENTS 1181992  11/1964  Fed. Rep. of Germany ... 192/67 A
1274623   5/1972  United Kingdom .
1288904   9/1972  United Kingdom .

Primary Examiner—Allan D. Herrmann
Attorney, Agent, or Firm—Woodcock, Washburn, Kurtz, Mackiewicz & Norris

[57] ABSTRACT

A pawl and ratchet mechanism has a baulking member which may be set in a ratcheting condition, a pawl free condition, and a baulking condition. A thrust member, engageable with the baulking member, is movable in first and second directions in which the baulking member is respectively moved towards and away from the ratcheting condition. A solenoid valve is settable in first and second conditions in which thrust is imparted to the thrust member to cause the latter to move respectively in the said first and second directions and detector means detects when the baulking member has moved into or out of the baulking condition, and into the pawl free condition, the detector means controlling the setting of the solenoid valve to that when the baulking member is in the baulking condition, the solenoid valve is so set that the thrust moves the baulking member towards the pawl free condition, the solenoid valve is so set that the thrust moves the baulking member towards the ratcheting condition.

12 Claims, 4 Drawing Figures

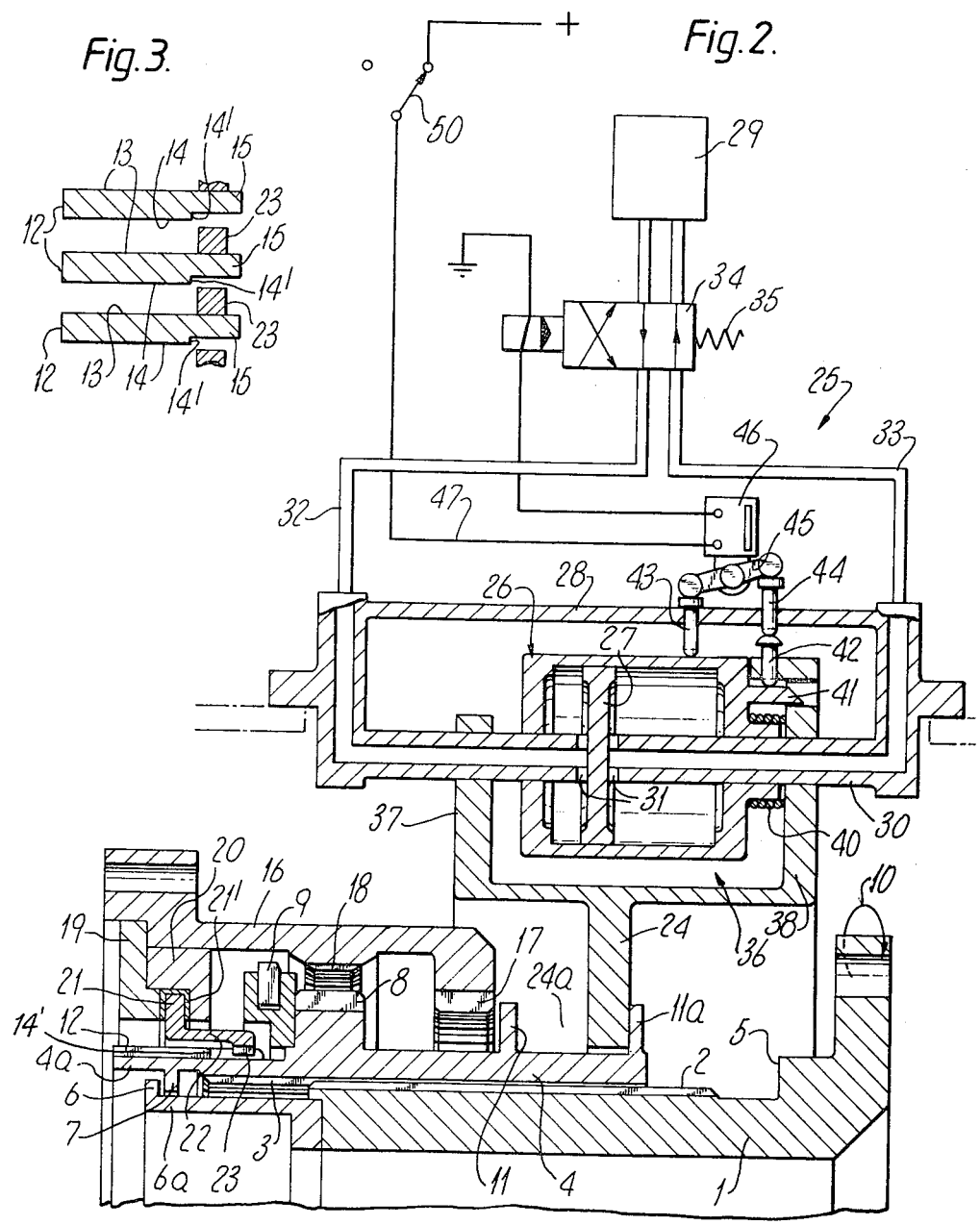

PAWL AND RATCHET MECHANISM

This invention relates to a pawl and ratchet mechanism.

In our U.S. Pat. No. 3,715,019 of Heybourne et al. there is disclosed a pawl and ratchet mechanism which may be operated in both a ratcheting and a pawl free condition in which the pawl and ratchet components of the mechanism are respectively in and out of engagement with each other, the mechanism having a movable baulking member which when in a baulking position prevents relative movement of the said components into the ratcheting condition, the baulking member being maintained in said baulking position when the relative rotation of the said components is inappropriate to permit the mechanism to be operated in the ratcheting condition, and means for moving the baulking member out of the baulking position when the said relative rotation is appropriate. The baulking member is provided with stepped baulking teeth which, when the baulking member is in the baulking position, are in effect locked in engagement with blocking teeth on a blocking ring, such locking of the teeth together being desirable to prevent their separation as a result of vibration. When, however, the relative rotation of the pawl and ratchet components is appropriate to permit movement of the baulking member out of the baulking position, there is only a small frictional force between the blocking ring and a bearing therefor which tends to effect such movement of the baulking member out of the baulking position. Consequently it has previously been necessary to constantly try to move the baulking member usually out of the baulking position and this could involve a considerable amount of operator time. The object of the present invention, therefore, is to make this operation automatic.

According, therefore, to the present invention there is provided a pawl and ratchet mechanism having a movable baulking member which may be set in both a ratcheting and a pawl free condition in which the pawl and ratchet components of the mechanism are respectively in and out of engagement with each other, the baulking member also being settable in a baulking condition which prevents relative movement of the said components into the ratcheting condition, the baulking member being maintained in the baulking condition which the relative rotation of the said components is inappropriate to permit the mechanism to be operated in the ratcheting condition, and a thrust member which is engageable with the baulking member or with means connected thereto and which is movable in first and second directions in which the baulking member is respectively moved towards and away from the ratcheting condition characterized by thrust switching means settable in first and second conditions in which, in operation, thrust is imparted to the thrust member to cause the latter to move respectively in the said first and second directions; and detector means which detects when the baulking member has moved into the baulking condition and when the baulking member has moved out of the baulking condition and into the pawl free condition, the detector means controlling the setting of the thrust switching means so that, in operation, when the baulking member is in the baulking condition, the thrust switching means is so set that the thrust moves the baulking member towards the pawl free condition, and when the baulking member has moved into the pawl free condition, the thrust switching means is so set that the thrust moves the baulking member towards the ratcheting condition.

The detector means may comprise relatively movable parts which are moved relatively to each other when the baulking member is moved into the baulking condition and into the pawl free condition, relative movement of said parts altering the setting of the thrust switching means.

The thrust switching means preferably comprises a solenoid valve connected in an electrical circuit which includes a manually operable selector switch and a trip switch for tripping the solenoid valve, the trip switch being arranged to be adjusted by the detector means.

The mechanism may form part of a synchronous self-shifting toothed clutch of the type comprising a first toothed rotary clutch part, a second toothed rotary clutch part, and an intermediate member constrained for helical movement relative to said second clutch part to bring the coacting clutch teeth into at least initial interengagement, the said pawl and ratchet mechanism being effective upon passage of the clutch parts through synchronism in one direction of relative rotation to shift the intermediate member into at least initial interengagement of its clutch teeth with the clutch teeth of said first clutch part, the components of the pawl and ratchet mechanism being carried by the first clutch member and the intermediate member respectively.

There may be provided a first thrust device arranged to be moved by thrust generation means in mutually opposite directions in dependence upon the setting of the thrust switching means, and a second thrust device which is connected to the said thrust member and which is movable by the first device in a predetermined direction by way of resilient means which permit differential movement between the first and the second thrust devices, the second thrust device also being movable by the first thrust device in the direction opposite to the said predetermined direction.

One of the thrust device may have a cam which adjusts the position of a part carried by the other thrust device whenever differential movement occurs between the thrust devices in either of the said opposite directions, the said part being engageable with at least one portion of the trip switch to adjust the latter. The said part may be alternately engageable with spaced portions of the trip switch.

The first thrust device may be a movable cylinder of a piston and cylinder unit, the thrust switching means controlling fluid flow to and from the piston and cylinder unit.

In one embodiment of the invention, the detector means comprises at least one piston movable in a cylinder, the said piston and the cylinder having ports which are brought into and out of communication with each other on relative movement of the said piston and the cylinder, the ports controlling flow of a pressure fluid to means for controlling the setting of the thrust switching means.

Preferably, there is a second piston which is movable in a cylindrical recess in the first-mentioned piston and which is resiliently urged towards a predetermined position in the latter in which it occludes a said port in the first-mentioned piston, the second piston being urged in operation by the said pressure fluid to open the said port when the baulking member is in the baulking condition.

The said means for controlling the setting of the thrust switching means may comprise first and second piston and cylinder units for respectively moving a switch member of the trip switch into ON and OFF positions, the piston of the first piston and cylinder unit being pressurized when the selector switch is in a pawl free position, and the piston of the second piston and cylinder unit being pressurized when the selector switch is in a ratcheting position and the baulking member is in the baulking condition.

Figure 4:
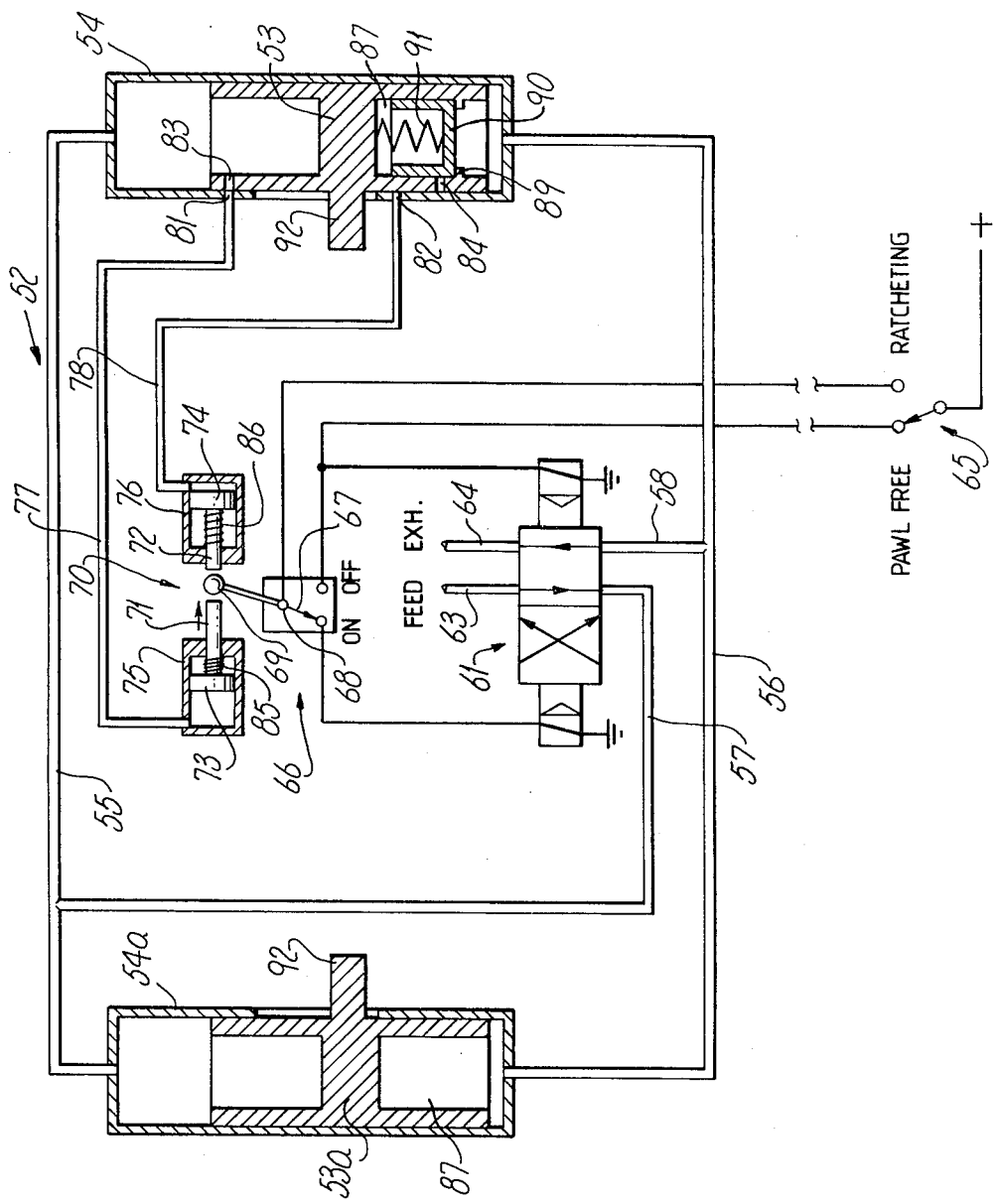

The invention is illustrated, merely by way of example, in the accompanying drawings, in which:

FIG. 1 is a partly schematic broken-away view in side sectional elevation of a first embodiment of a synchronous self-shifting toothed clutch embodying the invention, the clutch being shown in a pawl free viz, a bi-directionally free condition, FIG. 2 is a view similar to FIG. 1 but showing the clutch in a baulking condition, FIG. 3 is a development view of baulking teeth and blocking teeth, and FIG. 4 is a schematic view of a part of a second embodiment of a synchronous self-shifting toothed clutch embodying the invention.

Terms such as "left," "right," "clockwise," "counter-clockwise," "upper" and "lower," as used in the description below, are to be understood to refer to directions as seen in the accompanying drawings.

Referring first to FIGS. 1–3 of the drawings, the clutch includes a first clutch part or clutch input part 1 formed with external left-hand helical splines 2 with which are engaged internal helical splines 3 in an intermediate member 4, which is thereby constrained for helical movement relative to the clutch part 1, the said helical movement being limited in one direction by an axial stop formed by an annular shoulder 5 on the clutch part 1 and in the other direction by an axial stop formed by an annular flange 6 on a ring 6a fixed to the part 1, the flange 6 cooperating with a radially inwardly projecting annular flange 7 in the intermediate member 4. The intermediate member 4 is formed with a ring of external clutch teeth 8, and carries pawls 9 the noses of which point in counter-clockwise direction as viewed from the righthand end of the clutch. The pawls 9 are provided with control springs (not shown) which urge the noses of the pawls radially outwardly. The intermediate member 4 is also provided with a part 4a which forms a movable baulking member, the baulking member 4a being formed with a ring of external baulking teeth 12, each of which (FIG. 3) has a straight flank 13 and a flask 14 which is stepped to form a part 15 of reduced circumferential thickness at one end of the tooth. As seen from the left-hand end of the clutch in FIG. 1, the straight flanks 13 of the baulking teeth 12 face in the counter-clockwise direction and the stepped flanks 14 face in the clockwise direction. As will be clear from the description below, the baulking member 4a may be disposed in a pawl free condition, a baulking condition, and a ratcheting condition.

A second clutch part or clutch output part is constituted by a sleeve 16 carrying a ring of internal clutch teeth 17 and a ring of internal ratchet teeth 18. The sleeve 16 also carries annular members 19 and 20 shaped so as to provide between them an internal groove, in which is accommodated a ring 21 forming part of a blocking tooth carrier. A white metal bearing 21' is provided between the ring 21 and the said groove. The blocking tooth carrier also includes a cylindrical member 22 which projects from the inner periphery of the ring 21 and carries a ring of internal blocking teeth 23 which are interengaged with the baulking teeth 12.

With the clutch in an unidirectionally free or ratcheting condition, not shown, the external clutch teeth 8 are out of engagement with the internal clutch teeth 17 and the pawls 9 are in ratcheting relationship with the ratchet teeth 18. With the clutch output part 16 rotating in counter-clockwise direction relative to the clutch input part 1 as seen from the right-hand end of the clutch, the pawls 9 ratchet relative to the ratchet teeth 18 and the clutch over-runs.

The ring 21 forming part of the blocking tooth carrier is rotatably slidable in its bearing 21'. When the clutch parts 1 and 16 are in relative rotation in the over-running direction as above described, the drag on the ring 21 of the blocking tooth carrier, due to the friction between the ring 21 and the bearing 21', is such that the blocking teeth 23 are maintained in contact with the straight flanks 13 of the baulking teeth 12.

When the direction of relative rotation of the clutch parts 1 and 16 reverses, the pawls 9 engage the ratchet teeth 18 and the intermediate member 4 is thereby shifted helically, to the right in FIG. 1, along the clutch input part 1 so as to bring the external clutch teeth 8 precisely into initial interengagement with the intenal clutch teeth 17, whereupon the interaction of the clutch teeth 8 and 17 in conjunction with the helical splines 2 and 3 draws the intermediate member 4 into full toothed engagement with the second clutch part 16 and against the axial stop 5, so that the clutch is engaged. When the direction of relative rotation of the clutch parts 1 and 16 again reverses the interaction of the clutch teeth 8 and 17 in conjunction with the helical splines 2 and 3 shifts the intermediate member 4 to the left so as to bring the external clutch teeth 8 out of engagement with the internal clutch teeth 17 and to bring the pawls 9 back into ratcheting engagement with the ratchet teeth 18. During these movements of the intermediate member 4, the baulking teeth 12 slide relative to the blocking teeth 23.

As so far described, the clutch is undirectionally free, that is to say for one direction of relative rotation of the clutch parts 1 and 16 the clutch overruns with the pawls 9 ratcheting relative to the ratchet teeth 18, whereas upon reversal of the direction of relative rotation of the clutch parts 1 and 16 the clutch engages as above described.

In order to bring the clutch to a condition of bi-directional freedom, viz., the pawl free condition, which is shown in FIG. 1, the intermediate member 4 is shifted to the left to a position in which the pawls 9 are axially clear of the ratchet teeth 18, as shown in FIG. 1. This movement of the intermediate member 4 is effected by operating (as described below) an axially movable control fork or thrust member 24 engaged with lost motion in an external annular groove or recess 24a, in the intermediate member 4, the annular recess 24a being defined between spaced apart flanges 11, 11a of the intermediate member 4. During this movement of the intermediate member 4, the baulking teeth 12 move so far to the left that the baulking teeth 23 move on to the parts 15 of the baulking teeth 12 of reduced circumferential width. So long as the direction of relative rotation of the clutch part 1 and intermediate member 4 relative to the clutch part 16 corresponds to the ratcheting direction of relative rotation of the pawls 9 and ratchet teeth 18, as shown by the arrow 10 in FIG. 1, the blocking teeth 23 are held in contact with the straight flanks 13 of the baulking teeth 12 (FIG. 3) by the frictional drag on the blocking tooth carrier due to the friction between the ring 21 and the surfaces of the bearing 21' in which it is accommodated. Hence it is possible, by operating the control fork 24, to shift the intermediate member 4 to the right to bring the pawls 9 into ratcheting relationship with the ratchet teeth 18. If, however, while in the pawl free condition, the direction of relative rotation of the clutch parts 1 and 16 is in the direction opposite to the arrow 10, the blocking teeth 23 are held, by frictional drag, against the flanks of the narrow parts 15 of the baulking teeth 12, on the stepped sides 14' thereof. Hence if an attempt is made to shift the intermediate member 4 to the right, the steps 14' on the baulking teeth 12 come into axial engagement with the blocking teeth 23 so as to prevent further movement of the intermediate member 4 to the right such as would bring the pawls 9 into contact with the ratchet teeth 18 and cause damage. This baulking condition of the mechanism is shown in FIG. 2.

The operator is therefore obliged to wait for the direction of relative rotation of the clutch parts 1 and 16 to reverse before the intermediate member 4 can be shifted to the right.

As so far described, the clutch is constructed and arranged as shown in greater detail in our U.S. Pat. No. 3,715,019 of Heybourne et al. to which reference should be made. In such a clutch, however, if the clutch is in the baulking condition, shown in FIG. 2, it will not itself "un-baulk" if the direction of relative rotation of the clutch parts 1, 16 returns to that indicated by the arrow 10. This is because, in the baulking condition, the blocking teeth 23 are in effect locked in position in the steps 14', and the frictional force between the ring 21 and the bearing 21' is not sufficient to move the baulking teeth 12 out of their baulking positions. Consequently, in order to get the clutch eventually into the unidirectionally free or ratcheting condition (not shown) in which the pawls 9 are in ratcheting relationship with the ratchet teeth 18, the control fork 24 has to be shifted repeatedly between its baulking positions as shown in FIG. 2 and its bi-directionally free position as shown in FIG. 1 until the rotational sense is correct for the clutch to pass through to the ratcheting condition, i.e. until the relative rotation of the clutch parts 1, 16 is as indicated by the arrow 10.

This shifting backwards and forwards of the control fork 24 so as to move the baulking member 4a towards and away from the ratcheting condition has previously involved constant manual operation of an electro-hydraulic control unit used to move the control fork 24. In the case of the present invention, however, this movement of the control fork 24 is effected automatically by means of an electro-hydraulic control unit 25.

The electro-hydraulic control unit 25 comprises a movable cylinder 26 within which there is mounted a stationary piston 27, the movable cylinder 26 being mounted within a casing 28. The stationary piston 27 is carried by an hydraulic conduit 30 which extends through the casing 28 and which has apertures 31 to enable the interior of the hydraulic conduit 30 to communicate with the interior of the movable cylinder 26 on opposite sides of the stationary piston 27. Opposite ends of the hydraulic conduit 30 are respectively connected by pipes 32, 33 to an hydraulic pressure source 29, the flow through the pipes 32, 33 being controlled by a solenoid valve 34. The solenoid valve 34, when de-energised as shown in FIG. 1, is urged by a spring 35 towards a position in which a pressure oil feed from the source 29 is connected to the pipe 32, while the pipe 33 is connected to exhaust. In the FIG. 1 position of the parts, therefore, the movable cylinder 26 is forced towards its left-most position. When, however, the solenoid valve 34 is energised, it is moved towards the right against the action of the spring 35 and into a position (not shown) in which the pressure oil feed and the exhaust are respectively connected to the pipes 33, 32 so as to urge the movable cylinder 26 towards its right-most position. The solenoid valve 34 therefore acts as a thrust switching means and, as well be clear from the description below, when the solenoid valve 34 is respectively energised and de-energised, thrust is imparted to the control fork 24 to cause the latter to move respectively towards and away from the ratcheting condition.

The movable cylinder 26 is mounted in part within a thrust shoe 36 having flanges 37, 38. A pre-compressed spring 40 is interposed between the movable cylinder 26 and the flange 38.

The movable cylinder 26 has a cam 41 which engages a plunger 42 carried by the flange 38. The plunger 42 is selectively engageable with spaced plungers 43, 44 carried by a lever 45 of a single pole trip switch 46 having an over-centre operation, the plungers 43, 44 being slidably mounted in apertures in the casing 28 so as to extend therethrough. The trip switch 46 is connected in an electrical circuit 47 in which there is connected the solenoid valve 34, a selector switch 50, and an electrical power source (not shown). The selector switch 50 is settable in a pawl free and a ratcheting position.

When the clutch is in the bi-directionally free or pawl free condition shown in FIG. 1, the selector switch 50 will be kept in its pawl free or open position shown in FIG. 1. In this position, the solenoid valve 34 will be de-energised, the spring 35 will push the solenoid valve 34 towards the left, the movable cylinder 26 will be hydraulically forced towards the left so as to engage the flange 37 of the thrust shoe 36, and the latter will force the control fork 24 against the flange 11 of the intermediate member 4 so as to urge the intermediate member 4 towards the left. The hydraulic pressure will thus maintain the clutch in the bi-directionally free or pawl free condition.

If, with the parts of the clutch in the pawl free condition shown in FIG. 1 the selector switch 50 is closed, i.e. it is moved to its ratacheting position, the solenoid valve 34 will be energised and will move to the right against the action of the spring 35. This will cause the pressure oil feed and the exhaust to be respectively connected to the pipes 33, 32 and the movable cylinder 26 will therefore be forced towards the right. A rightwards force will therefore be imparted to the thrust shoe 36 by way of the spring 40, although at this stage, as resistance to sliding within the clutch is low, the thrust force is insufficient to exceed the pre-compression in the spring 40 so that no differential movement takes place between the movable cylinder 26 and the thrust shoe 36. The control fork 24, however, will be moved into contact with the flange 11a and the clutch will therefore be urged towards the ratcheting condition. Accordingly, if the relative rotation of the clutch parts 1, 16 is in the correct sense, i.e. in the direction indicated by the arrow 10, the clutch will assume the ratcheting condition without further relative movement of the parts of the unit 25. Thus the trip switch 46 will remain closed.

However, if the rotation of the clutch input part 1 relative to the clutch output part 16 is in the direction opposite to the arrow 10, the intermediate member 4 cannot be moved to the right since it will be maintained in the baulking condition by the engagement between the baulking teeth 12 and the blocking teeth 23. The hydraulic force acting on the movable cylinder 26 will thus force the latter to exceed the pre-composition of the spring 40 and differential movement will take place between the movable cylinder 26 and the thrust shoe 36 so as to cause the movable cylinder 26 to engage the flange 38 of the thrust shoe 36. This will cause the cam 41 on the movable cylinder 26 to displace vertically the plunger 42 carried by the thrust shoe 36. This in turn will vertically displace the plunger 44 so as to open the trip switch 46. The solenoid valve 34 will therefore be de-energised and will be moved towards the left by the spring 35.

As will be appreciated, therefore, the parts 40–46 constitute a means of detecting when the baulking member 4a has moved into the baulking condition and these means, as will be clear from the description below, control the solenoid valve 34 so that, when the baulking member 4a is in the baulking condition, the setting of the solenoid valve 34 is such that the thrust moves the baulking member towards the pawl free condition.

At this particular moment the parts both of the clutch and of the unit 25 will be in the positions shown in FIG. 2. As a result, the pressure oil feed and exhaust will be respectively in communication with the pipes 32, 33 and the movable cylinder 26 will be moved to the left. This will first cause the spring 40 to extend and will then bring the movable cylinder 26 into contact with the flange 37, whereby to urge the intermediate member 4 towards the left, so that the clutch will return to the bi-directionally free or pawl free condition.

However, the trip switch 46 will remain "tripped" when the cam 41 is withdrawn from the plunger 42 and will not be re-set until the movable cylinder 26 and the thrust shoe 36 have moved relatively to each other so that they are in the positions which they adopt in the bi-directionally free or pawl free condition. When in this condition, however, the plunger 42 will be moved into contact with and will raise the plunger 43 so as to reset the trip switch 46. This will cause the solenoid valve 34 to be energised again, and the movable cylinder 26 to be moved towards the right with the consequences indicated above. Thus, as will be appreciated, the parts 40–46 also constitute a means of detecting when the baulking member 4a has moved out of the baulking condition and into the pawl free condition, and these means control the solenoid valve 34 so that when the baulking member 4a has moved into the pawl free condition, the setting of the solenoid valve is such that the thrust moves the baulking member 4a towards the ratcheting condition.

So long as the switch 50 is closed, the unit 25 will thus sequentially move the thrust shoe 36 leftwards and rightwards over and over again as long as the clutch input part 1 continues to rotate relative to the clutch output part 16 in the direction opposite to the arrow 10.

Once, however, the relative rotation of the clutch parts 1, 16 is in the opposite sense indicated by the arrow 10, the clutch will move beyond the baulking condition to the ratcheting condition.

The unit 25 has been described as an hydraulic unit, but it could of course be pneumatic, electrical or mechanical.

The unit 25 is shown in FIGS. 1 and 2 as a stationary unit which is separate from the clutch proper. However, the unit 25 may be incorporated in the clutch to rotate therewith if desired.

If, however, the unit 25 is so incorporated in the clutch, it will be subjected to oil vapour which may adversely affect the operation of its grip switch 46. In the embodiment shown in FIG. 4, however, it is possible to incorporate the said unit in the clutch while enabling any switches to be mounted outside the clutch housing where they are more readily accessible and where they are not subjected to an oil atmosphere.

In FIG. 4 there is therefore shown schematically a unit 52 which may be used in substitution for the unit 25.

The unit 52 comprises two pistons 53, 53a which are movable in respective cylinders 54, 54a. The upper end of each of the cylinders 54, 54a communicate with a pipe 55, while the lower end of each of the cylinders 54, 54a communicates with a pipe 56. The pipes 55, 56 respectively communicate with pipes 57, 58, flow through the pipes 57, 58 being controlled by a solenoid valve 61. The solenoid valve 61, when set as shown in FIG. 4, is in a position in which a pressure oil feed pipe 63 is connected to the pipe 57, while the pipe 58 is connected to an exhaust pipe 64. When, however, the solenoid valve 61 is set in its alternative position (not shown) the pressure oil feed pipe 63 and exhaust pipe 64 are respectively connected to the pipes 58, 57. As will be clear from the description below, the solenoid valve 61 thus constitute a thrust switching means which, when set in its alternative positions, causes the thrust to move the pistons 53, 53a upwardly and downwardly respectively.

The solenoid valve 61 is connected in an electrical circuit which includes a manually operable selector switch 65 and a trip switch 66. The selector switch 65 is a single pole switch which may be moved between a "locked out" or pawl free position and a ratcheting position.

The trip switch 66 is a two-position switch having a single pole 67 which is pivoted at 68 and which is movable between ON and OFF positions by a switch actuating unit 70. The pole 67 has a head 69 which is disposed between and engageable by piston rods 71, 72 which respectively carry pistons 73, 74 slidable in cylinders 75, 76 respectively. The left hand end of the cylinder 75 and the right hand end of the cylinder 76 communicate with pipes 77, 78 respectively which have permanent bleeds (not shown) therein.

The cylinder 54 has ports 81, 82 wherein which communicate with the pipes 77, 78 respectively and which also communicate with ports 83, 84 respectively in the piston 53 when the latter is appropriately positioned. Springs 85, 86 respectively urge the pistons 73, 74 to the left and right respectively.

The piston 53 has a cylindrical recess 87 within which there is slidably mounted an auxiliary piston 90 which is urged downwardly by a spring 91. The auxillary piston 90 is movable between the position shown in FIG. 4, in which the auxiliary piston 90 engages stops 89 and occludes the port 84, and a position (not shown) in which it is moved upwardly against the action of the spring 91 so as to open the port 84.

Each of the pistons 53, 53a has an integral lug 92 which corresponds to the control fork 24 and which constitutes a thrust member which is engageable with the flanges 11, 11a of FIGS. 1 and 2. The lugs 92, as described below, are movable upwardly and downwardly so that the baulking member 4a of FIGS. 1 and 2 is respectively moved towards and away from the ratcheting condition.

In operation, when the selector switch 65 is placed in the "locked out" or pawl from position, the parts will be disposed as shown in FIG. 4. Thus the electrical circuit comprising the selector switch 65 and trip switch 66 will be open-circuited and the solenoid valve 61 will therefore be set as shown in FIG. 4. Pressure will therefore be transmitted from the feed pipe 63 to the pipes 57, 55 so that the pistons 53, 53a will be forced downwardly to the positions shown. The lugs 92 will thus engage the flange 11 (FIGS. 1 and 2) so as to retain the latter in the pawl free position.

In the FIG. 4 position of the parts, the auxiliary piston 90 occludes the port 84, while the port 83 is aligned with the port 81. Pressure will therefore be transmitted to the piston 73 so as to move the latter towards the right, whereby the pole 67 of the trip switch 66 will be disposed as shown in FIG. 4, so that the solenoid valve 61 will remain set as shown in FIG. 4. Since the port 82 will be occluded, the hydraulic fluid in the pipe 78 will not be pressurised and the piston 74 will be in the position shown, which is that adopted during ratcheting.

If now the selector switch 65 is moved to the ratcheting position, the solenoid valve 61 will be moved to its said alternative position and the feed pipe 63 and exhaust pipe 64 will respectively communicate with the pipes 58, 57. The piston 53 will therefore be forced upwardly, so as to move the port 83 out of alignment with the port 81. Initially, however, the port 84 will not be aligned with the port 82 and will still be occluded by the auxiliary piston 90. At this stage, therefore, the pole 67 will remain in its FIG. 4 position, and the lugs 92 will be disposed between the flanges 11, 11a.

When, however, the lugs 92 have moved into engagement with the flange 11a so that they start to move the latter towards the ratcheting position, if the rotation of the clutch input part 1 relative to the clutch output part 16 is in the direction opposite to the arrow 10, the intermediate members will be maintained in the baulking condition by the engagement between the baulking teeth 12 and the blocking teeth 23. In the baulking condition, the upward movement of the piston 53 will be stopped, with the result that the pressure acting on the bottom of the auxiliary piston 90 will force the latter upwardly relatively to the piston 53 and will therefore open the port 84. The port 84 will, however, at this time be aligned with the port 82. Pressure will therefore be transmitted through the pipe 78 to move the pole 67 counterclockwise from the position shown in FIG. 4. The trip switch 66 will therefore be moved to its OFF position and the solenoid valve 61 will be moved to its FIG. 4 position. The pressure feed pipe 63 and exhaust pipe 64 will therefore respectively communicate with the pipes 57, 58, with the result that the pistons 53, 53a and lugs 52 will be driven downwardly.

Thus, as will be appreciated, the parts 82, 84, 90 will constitute a means of detecting when the baulking member 4a has moved into the baulking condition, and these detector means will control the setting of the solenoid valve 61 so that, when the baulking member 4a is in the baulking condition, the setting of the solenoid valve 61 will be such that the thrust will move the baulking member 4a towards the pawl free condition.

When, however, the piston 53 has moved sufficiently downwardly to bring the baulking member 4a into the pawl free condition, the port 83 will be aligned with the port 81 with the result that pressure will be transmitted through the hydraulic fluid in the pipe 77 to move the pole 67 clockwise, i.e. into the ON position shown in FIG. 4. The solenoid valve 61 will therefore be in its said alternative position, so that the feed pipe 63 and exhaust pipe 64 will communicate with the pipes 58, 57 respectively. The pistons 53, 53a will therefore be moved upwardly and if at this stage the rotation of the clutch input part 1 relative to the clutch output part 16 is in the direction of the arrow 10, the lugs 92 will move the baulking member 4a into the ratcheting position and ratcheting will be achieved.

Thus it will be appreciated that the parts 81, 83 will constitute a means of detecting when the baulking member 4a has moved out of the baulking condition and into the pawl free condition, and those detector means will control the setting of the solenoid valve 61 so that, when the baulking member 4a has moved into the pawl free condition, the solenoid valve 61 is so set that the thrust will move the baulking member 4a towards the ratcheting condition.

If, of course, when the baulking member 4a is moved towards the ratcheting condition, the rotation of the clutch input part 1 relative to the clutch output part 16 is in the direction opposite to the arrow 10, baulking will occur and the baulking member 4a will be driven back to the pawl free condition and then will be returned towards the ratcheting position. The baulking member 4a will thus be moved backwards and forwards until the relative rotation of the parts 1, 16 is such that ratcheting can occur.

We claim:

1. In a pawl and ratchet mechanism having a movable baulking member which may be set in both a ratcheting and a pawl free condition in which the pawl and ratchet components of the mechanism are respectively in and out of engagement with each other, the baulking member also being settable in a baulking condition which prevents relative movement of the said components into the ratcheting condition, the baulking member being maintained in the baulking condition when the relative rotation of the said components in inappropriate to permit the mechanism to be operated in the ratcheting condition, and a thrust member which is engageable with the baulking member or with means connected thereto and which is movable in first and second directions in which the baulking member is respectively moved towards and away from the ratcheting condition the improvement which comprises thrust switching means settable in first and second conditions in which, in operation, thrust is imparted to the thrust member to cause the latter to move respectively in the said first and second directions and detector means which detects when the baulking member has moved into the baulking condition and when the baulking member has moved out of the baulking condition and into the pawl free condition, the detector means controlling the setting of the thrust switching means so that, in operation, when the baulking member is in the baulking condition, the thrust switching means is so set that the thrust moves the baulking member towards the pawl free condition, and when the baulking member has moved into the pawl free condition, the thrust switching means is so set that the thrust moves the baulking member towards the ratcheting condition.

2. A mechanism as claimed in claim 1 in which the detector means comprises relatively movable parts which are moved relatively to each other when the baulking member is moved into the baulking condition and into the pawl free condition, relative movement of said parts altering the setting of the thrust switching means.

3. A mechanism as claimed in claim 1 or claim 2 in which the thrust switching means comprises a solenoid valve connected in an electrical circuit which includes a manually operable selector switch and a trip switch tripping the solenoid valve, the trip switch being arranged to be adjusted by the detector means.

4. A mechanism as claimed in claim 1 or claim 2 in which the mechanism forms part of a synchronous self-shifting toothed clutch.

5. A mechanism as claimed in claim 1 in which a first thrust device is arranged to be moved by thrust generation means in mutually opposite directions in dependence upon the setting of the thrust switching means, and there is a second thrust device which is connected to the said thrust member and which is movable by the first thrust device in a predetermined direction by way of resilient means which permit differential movement between the first and the second thrust devices, the second thrust device also being movable by the first thrust device in the direction opposite to the said predetermined direction.

6. A mechanism as claimed in claim 5 in which one of the thrust devices has a cam which adjusts the position of a part carried by the other thrust device whenever differential movement occurs between the thrust devices in either of the said opposite directions, the said part being engageable with at least one portion of the trip switch to adjust the latter.

7. A mechanism as claimed in claim 6 in which the said part is alternately engageable with spaced portions of the trip switch.

8. A mechanism as claimed in claim 5 or claim 6 or claim 7 in which the first thrust device is a movable cylinder of a piston and cylinder unit, the thrust switching means controlling fluid flow to and from the piston and cylinder unit.

9. A mechanism as claimed in claim 1 in which the detector means comprises at least one piston movable in a cylinder, the said piston and the cylinder having ports which are brought into and out of communication with each other on relative movement of the said piston and the cylinder, the ports controlling flow of a pressure fluid to means for controlling the setting of the thrust switching means.

10. A mechanism as claimed in claim 9 in which there is a second piston which is movable in a cylindrical recess in the first-mentioned piston and which is resiliently urged towards a predetermined position in the latter in which it occludes a said port in the first-mentioned piston, the second piston being urged in operation by the said pressure fluid to open the said port when the baulking member is in the baulking condition.

11. A mechanism as claimed in claim 9 in which the thrust switching means comprises a solenoid valve connected in an electrical circuit which includes a manually operable selector switch and a trip switch tripping the solenoid valve, the trip switch being arranged to be adjusted by the detector means.

12. A mechanism as claimed in claim 11 in which the said means for controlling the setting of the thrust switching means comprises first and second piston and cylinder units for respectively moving a switch member of the trip switch into ON and OFF positions, the piston of the first piston and cylinder unit being pressurised when the selector switch is in a pawl free position, and the piston of the second piston and cylinder unit being pressurised when the selector switch is in a ratcheting position and the baulking member is in the baulking condition.

* * * * *